United States Patent
Sawada

(10) Patent No.: US 7,343,792 B2
(45) Date of Patent: Mar. 18, 2008

(54) METHOD AND APPARATUS FOR INSPECTING OPERATION CONDITION OF PUMP

(75) Inventor: Kazutoshi Sawada, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 190 days.

(21) Appl. No.: 11/252,620

(22) Filed: Oct. 19, 2005

(65) Prior Publication Data
US 2006/0096363 A1    May 11, 2006

(30) Foreign Application Priority Data
Nov. 8, 2004   (JP) .............................. 2004-324089

(51) Int. Cl.
*G01M 19/00* (2006.01)
(52) U.S. Cl. ........................................................ 73/168
(58) Field of Classification Search ................. 73/168; 422/82, 100; 436/53; 137/58, 87.01–112
See application file for complete search history.

(56) References Cited

U.S. PATENT DOCUMENTS

| | | | |
|---|---|---|---|
| 5,885,470 A * | 3/1999 | Parce et al. ................... 216/33 |
| 5,958,203 A * | 9/1999 | Parce et al. ................... 204/451 |
| 6,062,261 A * | 5/2000 | Jacobson et al. ............ 137/827 |
| 6,150,180 A * | 11/2000 | Parce et al. ................... 436/514 |
| 6,260,407 B1 * | 7/2001 | Petro et al. .................. 73/61.52 |
| 7,010,964 B2 * | 3/2006 | Karp et al. ................... 73/61.52 |
| 7,015,043 B2 * | 3/2006 | Roos et al. ...................... 436/53 |
| 7,040,144 B2 * | 5/2006 | Spaid et al. ................ 73/54.05 |
| 7,214,320 B1 * | 5/2007 | Gregori et al. ............. 210/656 |
| 2003/0207338 A1 * | 11/2003 | Sklar et al. .................. 435/7.21 |

* cited by examiner

*Primary Examiner*—Hezron Williams
*Assistant Examiner*—John Fitzgerald
(74) *Attorney, Agent, or Firm*—Sughrue Mion, PLLC

(57) ABSTRACT

A circuit is used which includes: first and second channels having first and second input ports, respectively, and a third channel having an end where the first and second channel meet and are connected to the third channel. A first liquid to the first input port is supplied to generate a reference flow. A second liquid is supplied by the target pump to the second input port. An interface of the first and the second liquids joined in the third channel is inspected. The operation condition of the target pump is determined from a condition of the inspected interface. Pulsation in the flow supplied by the target pump is detected from waves in the interface visually inspected. The image of the interface may be magnified. Pulsation in the reference pump may be absorbed.

29 Claims, 4 Drawing Sheets

METHOD AND APPARATUS FOR INSPECTING OPERATION CONDITION OF PUMP

BACKGROUND OF THE INVENTION

1. Field of the Invention

The present invention relates to a method of inspecting an operation condition of a pump and an inspection apparatus for inspecting the operation condition of the pump.

2. Description of the Related Art

Micro-reactors are known which include microchannels allowing two kinds of liquids to flow therein to generate in the channel thereof a two-layer flow including an interface where chemical reaction occurs to efficiently obtain a product.

This reactor requires stable flows of the two kinds of liquids. In other words, it is desirable that both pumps discharge these liquids in stable operation conditions, respectively. More specifically, constant flow rates are required.

SUMMARY OF THE INVENTION

An aspect of the present invention provides a method of inspecting an operation condition of a pump generating a relatively small pressure.

Another aspect of the present invention provides a method of inspecting an operation condition of a target pump, comprising the steps of: (a) preparing a channel circuit including: first and second channels having first and second input ports, respectively, and a third channel having an end where the first and second channel meet and are continuously connected to the third channel; (b) supplying a first liquid to the first input port to generate a reference flow; (c) supplying a second liquid to the second input port by the target pump; (d) inspecting an interface of the first and the second liquids joined in the third channel; and (e) determining the operation condition of the target pump from a condition of the inspected interface.

A further aspect of the present invention provides an inspection apparatus comprising: a channel circuit comprising a substrate including first and second channels having first and second input ports, respectively, and a third channel having an end where the first and second channels meet and are continuously connected to the third channel; a reference pump for supplying a first liquid to the first input port to generate a reference flow, a second liquid supplied by the target pump through the second input port; and a visualizing mechanism for visualizing an image of an interface of the first and second fluids joined in the third channel.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

First Embodiment

Figure 1:
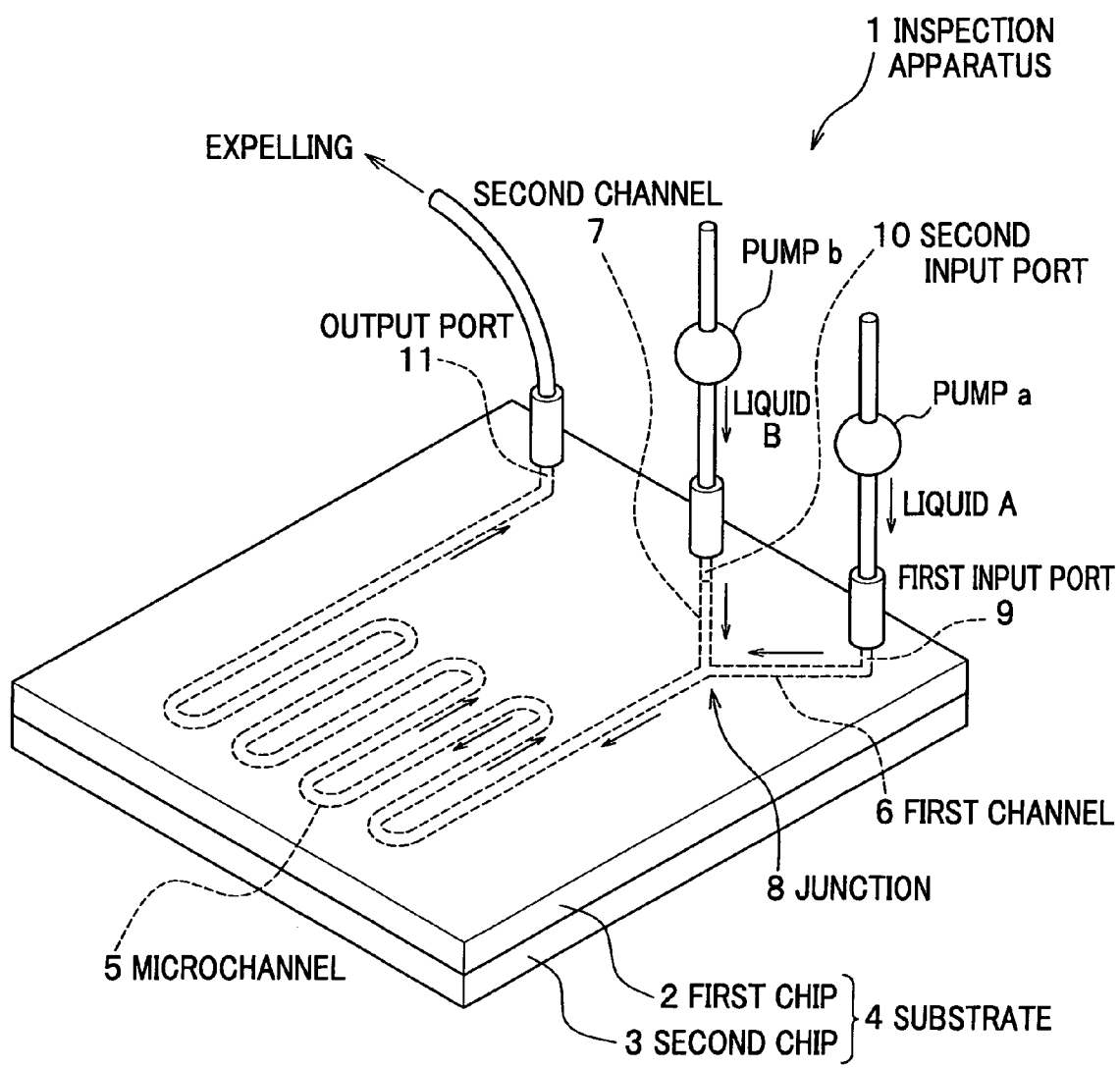
FIG. 1 is a perspective view of an inspection apparatus according to a first embodiment of the present invention.

Hereinafter will be described a first embodiment according to the present invention with reference to drawings. FIG. 1 shows an inspection apparatus 1. In this embodiment, the inspection apparatus 1 imitates a micro-reactor (circuit) in order to inspect an operation condition of a target pump.

The inspection apparatus 1 comprises first and second chips 2 and 3 in which first and second input channels (fluid channels) 6 and 7, and a microchannel (third channel) 5 are formed. The microchannel 5 has an end where the first and second channels 6 and 7 meet at a junction 8 and are continuously connected to the microchannel 5 and an end connected to an output port 11.

The first chip 2 and the second chip 3 are flat plates which are laminated to form a substrate 4. Sizes of the chips 2 and 3 are, for example, a width of 5 to 25 mm, a length of 10 to 75 mm, and a thickness of 1 to 5 mm. The chips 2 and 3 are made of glass, plastic, and the like.

The microchannel 5, the first and second input channels 6 and 7 are configured with grooves formed in the first chip 2 and symmetrical grooves are formed in the second chip 3. The first chip 2 is laminated on the second chip 3 with the grooves in the first chip 2 facing the grooves in the second chip 3. The microchannel 5 functions as an inspection fluid passage so that at least a part of the first and the second chips 2 and 3 is transparent or translucent to provide visual inspection of an image of interface between the first and second liquids A and B in the microchannel 5 to detect the operation condition of a pump b as a target pump. The microchannel 5 is not necessarily meandered, but may be linear, circular, or waved.

The first input port 9 is provided by forming in the first chip 2 a through hole that is communicated with the microchannel 5 through the first channel 6 and the junction 8. In other words, the first channel 6 is defined as a channel between the first input port 9 and the junction 8. Similarly, the second input port 10 is provided by forming in the first chip 2 a through hole that is communicated with the microchannel 5 through the second input channel 7 and the junction 8. In other words, the second input channel 7 is defined as a channel between the second input port 10 and the junction 8.

The output port 11 is provided by forming a through hole in the first chip 2 that is communicated with the microchannel 5. In this embodiment, no discharge pump is provided. However, a discharge pump may be provided.

The first input port 9 is supplied with a liquid A as a first liquid by a pump "a" as a reference pump. Similarly, the second input port 10 is supplied with a liquid B as a second liquid by a pump "b". More specifically, in this embodiment, the operation condition of the pump "b" is inspected as a target pump. As the pump "a", a pump discharging a liquid using a back pressure by a gas, a screw pump, and a syringe pump discharging the liquid A at a constant pressure are available for the pump "a". The syringe pump is configured such that a plunger is pushed at a constant speed by rotating a ball screw with a motor. A constant discharge pressure of the pump "a" provides inspection of minute pulsation of the pump "b".

Preferably, colors of the liquids A and B are different. Here, the difference in color includes that in color saturation, brightness, and transparency.

Although materials of the liquids A and B are not specifically specified, materials having a low affinity each other are preferable because they tend to form an interface therebetween.

In this configuration, the liquids A and B with different colors supplied from the pumps "a" and "b" flow through the input ports 9 and 10 and the first and second channels 6 and 7, respectively, and then join at the junction 8. Preferably, the joined stream forms a two-layer stream, and the joined stream is discharged at the output port 11.

FIGS. 2A to 2E show typical conditions of the interface between the liquids A and B around the junction 8 in enlarged views in which the liquid A is supplied from the left and the liquid B is supplied from the right in the drawings. A flow downstream from the junction 8 includes two layers between the liquids A and B as the interface indicated by a chain line. The condition shown in FIG. 2A indicates that the pump "b" is stable in a discharging pressure, namely, in a flow rate, because there is no wave in the interface. Further, the pump "b" discharges the liquid B at the same pressure as the pump "a", and the fluid passages from the pumps "a" and "b" to the portion around the junction 8 are symmetrically formed. Thus, the inspection of the condition of the interface provides judgment of the operation condition of the pump "b". In this embodiment, the condition of the interface may be visually inspected after enlargement of the view around the junction 8 in which a magnification is from about 2 to 100.

Figure 2A:
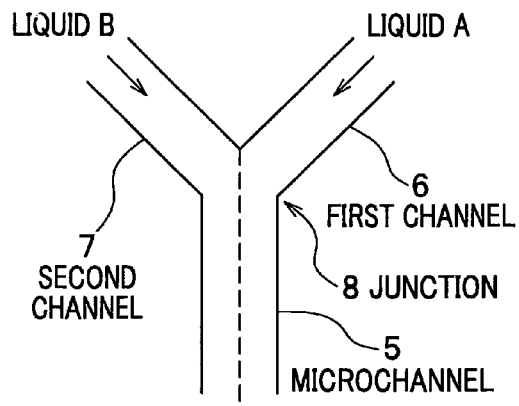
FIGS. 2A to 2E are illustrations showing examples of interface conditions according to the present invention.
Figure 2B:
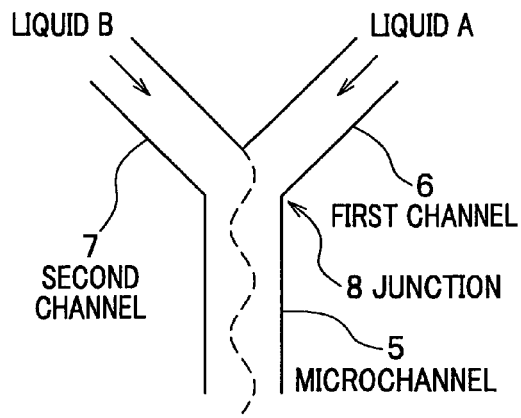
Figure 2C:
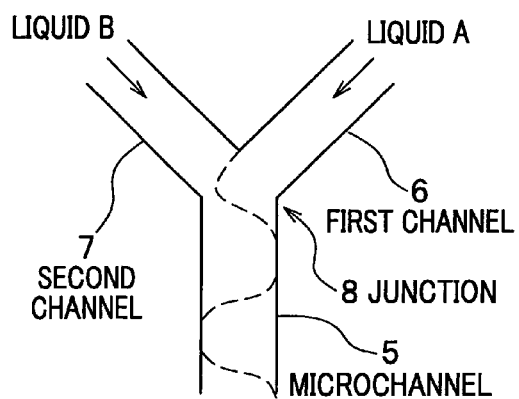
Figure 2D:
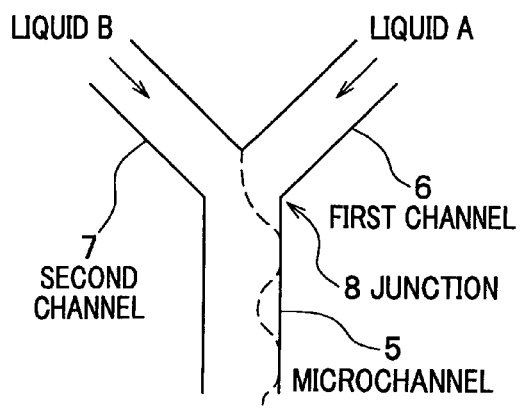

The conditions shown in FIGS. 2B to 2D indicate examples of interface conditions in which pulsation occurs. Thus, detection of waves in the interface provides detection of pulsation in the pump "b". FIG. 2B indicates a condition of the interface when the pulsation in the pump "b" is relatively low.

FIG. 2C indicates the condition of the interface when the pulsation in the pump "b" is greater than that shown in FIG. 2B. FIG. 2D indicates the condition of the interface when the pulsation in the pump "b" is larger than the shown in FIG. 2B, and the discharge pressure of the pump "b" is greater than that of the pump "a". In these conditions, a process is done to remove a cause of the pulsation in the pump "b". After that, the same inspection is performed, and if the interface becomes the condition shown FIG. 2A, it can be determined that the cause of the pulsation in the pump "b" has been removed.

Figure 2E:
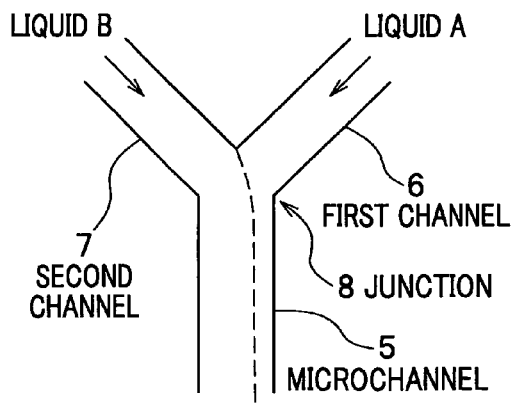

FIG. 2E shows the condition of the interface in which the discharge pressure of the pump "b" has no pulsation, but is higher than that of the pump "a". In this condition, the discharge pressure of the pump "b" is adjusted. As a result, if the condition of the interface becomes that shown in FIG. 2A, it is determined that the discharge pressure of the pump "b" is the same as that of the pump "a".

This embodiment has been described about the case where the flow in the microchannel 5 is layered. However, the flow may be turbulent. This condition can be detected when no interface is formed (not shown). In that case, after removal of the cause of the turbulence, the condition of the interface can be adjusted through the inspection.

Second Embodiment

Hereinafter will be described a second embodiment. The method of inspection and the inspection apparatus according to the second embodiment is substantially the same as those in the first embodiment. Thus, the common parts are designated as the same reference, omitting duplicated descriptions.

Figure 3:
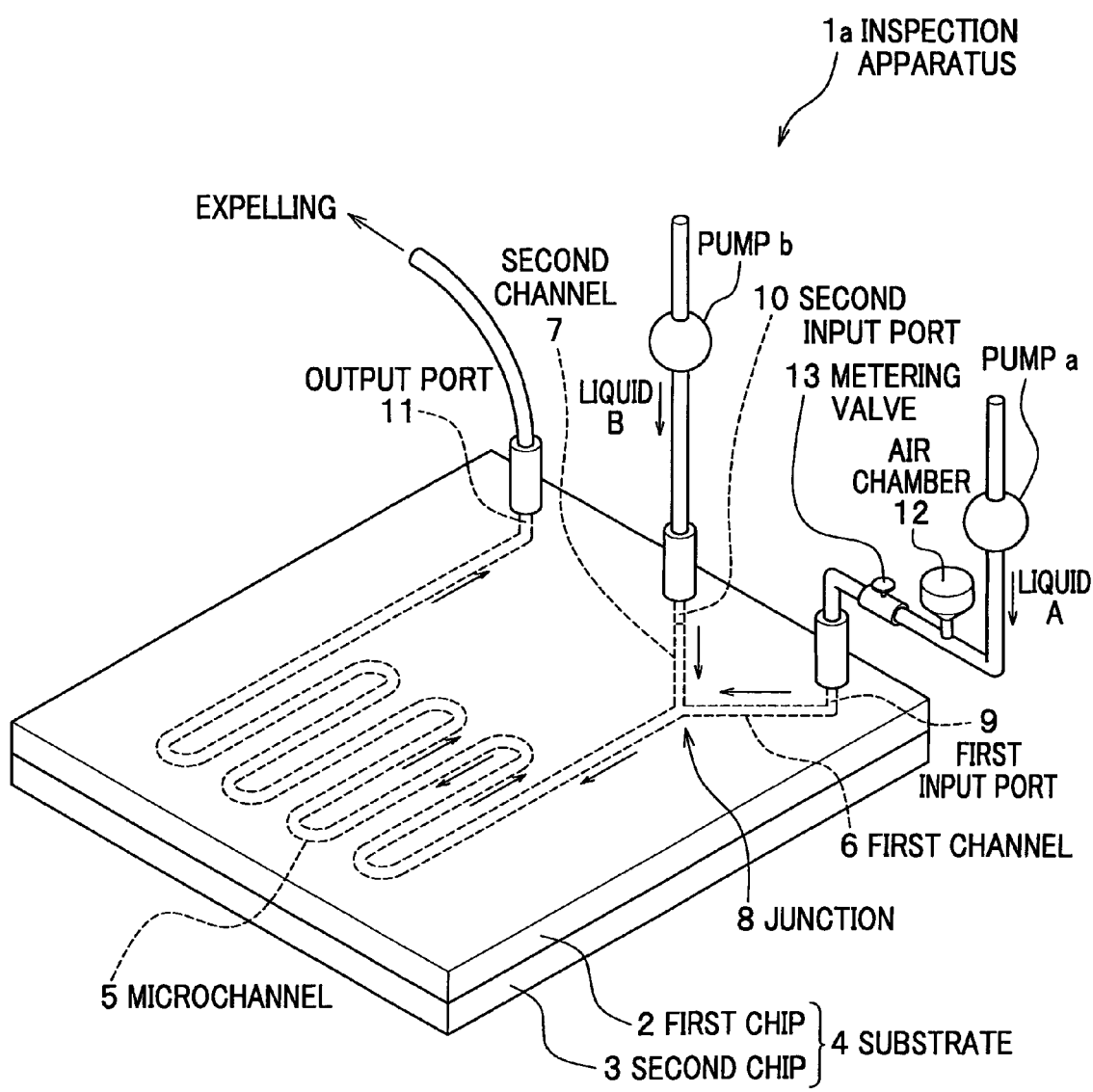
FIG. 3 is a perspective view of an inspection apparatus according to a second embodiment of the present invention.

FIG. 3 shows an inspection apparatus according to the second embodiment of the present invention.

An inspection apparatus 1a further comprises an air chamber 12 in a fluid passage at a discharge side of the pump "a" and a metering valve 13 arranged downstream from the air chamber 12. The air chamber 12 is sealed except it is communicated with the discharge side of the pump "a" and the metering valve 13, in which a lower part of the air chamber 12 is filled with the liquid A and the upper part is filled with air.

The metering valve 13 provides resistance in the fluid passage at the discharge side of the pump "a" to allow the air chamber 12 to absorb pulsation in the liquid A. However, the metering valve 13 is not always necessary.

In this apparatus, increase in the discharge pressure due to pulsation in the pump "a" compresses the air in the air chamber 12 rather the liquid A in the fluid passage because a resistance component in the air chamber 12 is lower than a resistance component (capacitive reactance, i.e., impedance) of the fluid passage from the air chamber 12 to the junction 8, so that energy in the increased pressure in pulsation is used to compress the air and the energy is stored in the air chamber 12. After that, the compressed air expands, so that the expansion energy compensates decrease in pressure in pulsation. Thus, the discharge pressure is smoothed. Accordingly, the reference flow becomes stable, so that a more accurate inspection result is provided. The metering valve 13 adjusts a time constant in the filter configured by the air chamber 12 and the metering valve 13.

The method of inspection according to the second embodiment is the same as that of the first embodiment, and thus a duplicated description is omitted.

As mentioned above, the operation condition of the target pump "b" can be detected by simple inspection, namely, the visual inspection, at a low cost without a complicated apparatus. When the pulsation is detected, the operation condition of the pump "a" is adjusted with reference to the inspection by the inspection apparatus according to the invention. Accordingly the operation condition of the pump "b" can be simply controlled through the visual inspection.

The present invention has been described regarding the above embodiments. However, the present invention is not limited to the above mentioned embodiments, but can be modified. For example, the condition of the interface was visually inspected. However, it is also possible to shoot the image of the interface by a camera and the image data is processed to easily detect the condition of the interface.

Third Embodiment

Figure 4:
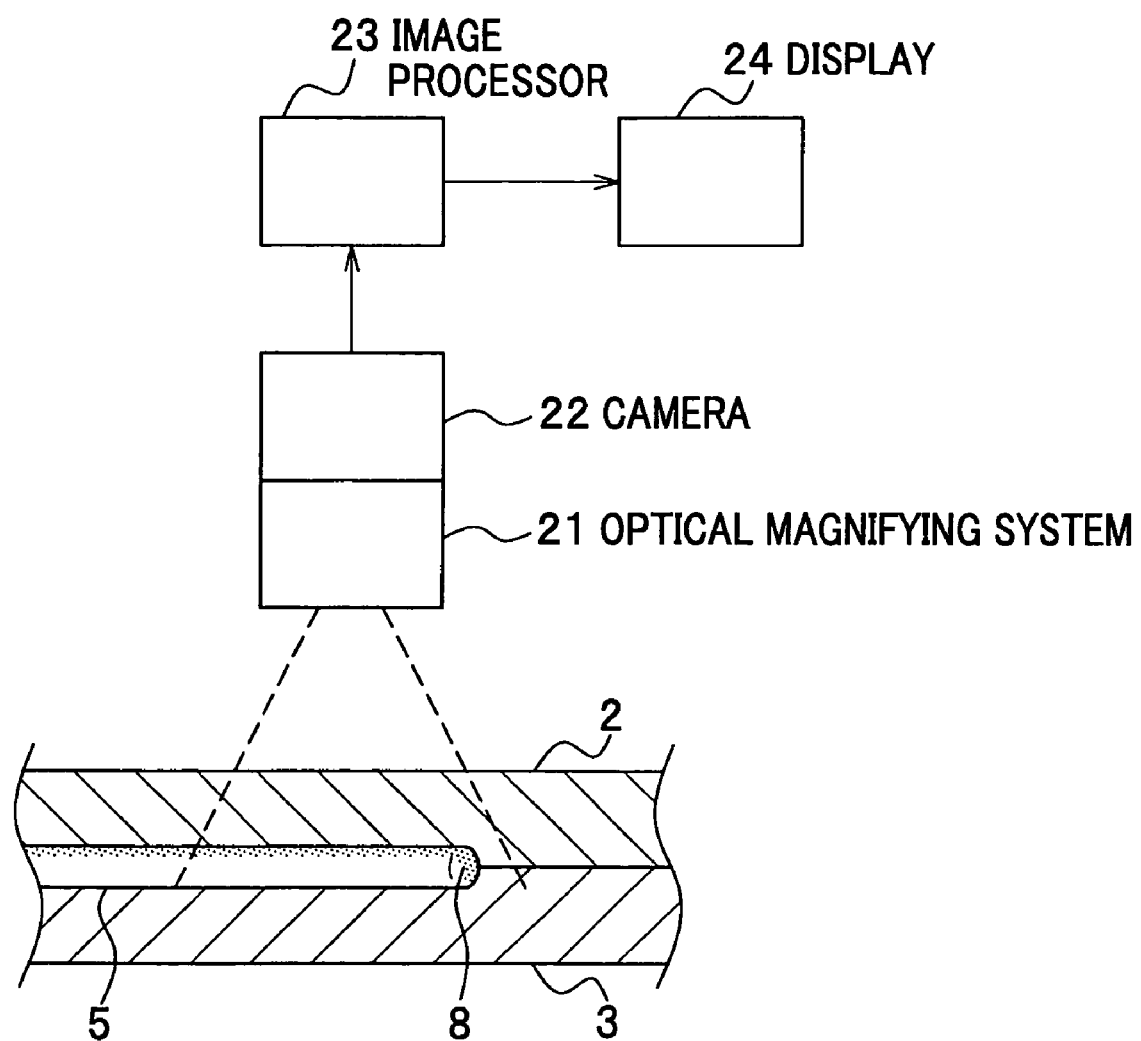
FIG. 4 is a block diagram of the inspection apparatus according to a third embodiment of the present invention.

Hereinafter will be described a third embodiment. The method of inspection and the inspection apparatus according to the third embodiment is substantially the same as those in the first and second embodiments. FIG. 4 is a block diagram of an inspection apparatus having an assist function for visually inspection according to a third embodiment of the present invention.

The inspection apparatus according to the third embodiment comprises an optical magnifying system 21, a camera 22, an image processor 23, and a display 24 in addition to the inspection apparatus 1 or 1a (partially shown in FIG. 4).

An image of the interface in the microchannel 5 is optically magnified with the optical magnifying system 21. The camera 22 shoots an enlarged image from the optical magnifying system 21. The camera 22 supplies an image signal of the enlarged image to the image processor (computer) 23. The image processor 23 processes the image signal to generate a video signal supplied to the display 24 which displays the enlarged image of the interface. Thus, the inspector can monitor the image of the interface to detect the condition of the pump "b". Further, the inspector easily detects, with the display 24, an magnitude of the wave in the interface shown in FIGS. 2B, 2C, and 2D, difference in the pressure between the liquids A and B shown in FIGS. 2D and 2E, and a time interval, or a frequency of the wave (pulsation) shown in FIGS. 2B, 2C, and 2D.

In the above-described first to third embodiments, the image of the interface is judged by inspection by the inspector. However, the image processor 23 can detect the interface and a magnitude of waves in the interface to detect a magnitude of the pulsation in the discharge pressure to determine a presence or an absence of the pulsation through image processing. Further, the image processor 23 can compare the detected magnitude of the pulsation with a threshold to determine the presence or the absence of the pulsation. More specifically, first, a border of the shot image indicated by the difference in color is detected as an image of the interface. Next, peak levels and a bias are detected as distances from the center line of the microchannel 5. Further, frequency of the wave is detected from the detected peaks.

In the above-described first to third embodiments, the first and second input channels 6 and 7, and the microchannel 5 are formed by laminating the grooves in the first and second chips 2 and 3 with the grooves in the first and second chips 2 and 3 facing with each other. However, the channels 6 and 7 may be provided by forming simple tubes in a single substrate.

Further, the operation condition of the pump "b" such as pulsation is detected from the condition of the interface in the microchannel which is a minute fluid passage. However, the fluid passage is not limited to this scale.

In addition, the embodiments are described with assumption in which the flow to be inspected is a laminar flow. However, a turbulent flow is preferable in some case where two kinds of liquids flow with these liquids mixed. In such the case, this method is used for inspecting whether the turbulent flow occurs, namely, mixing is properly done by the pump "b".

Further, the embodiments have been described with the fluid-tight channel circuit including the first and second channel 6 and 7 and the microchannel 5. However, the channels may be open upwardly as long as the pulsation in the interface can be observed.

The invention claimed is:

1. A method of inspecting an operation condition of a target pump, comprising the steps of:
   (a) preparing a circuit including: first and second channels having first and second input ports, respectively, and a third channel having an end where the first and second channels meet and are continuously connected to the third channel;
   (b) supplying a first liquid to the first input port to generate a reference flow;
   (c) supplying a second liquid to the second input port by the target pump;
   (d) inspecting an interface of the first and second liquids joined in the third channel; and
   (e) determining the operation condition of the target pump from a condition of the inspected interface.

2. The method as claimed in claim 1, further comprising the step of differentiating color of the first liquid from color of the second liquid to inspect the interface in the step (d).

3. The method as claimed in claim 1, wherein in the step (b), the reference flow is generated with a reference pump connected to the first input port, and the reference pump comprises a pump that discharges the first liquid by a back pressure of a gas.

4. The method as claimed in claim 1, wherein, in the step (b), the reference flow is generated with a reference pump connected to the first input port, and the reference pump comprises a screw pump.

5. The method as claimed in claim 1, wherein, in the step (b), the reference flow is generated with a reference pump which comprises a syringe pump.

6. The method as claimed in claim 1, wherein in the steps (b) and (c), liquids having a low affinity are used for the first and second liquids having tendency to readily form the interface therebetween.

7. The method as claimed in claim 1, wherein in the step (b), the first liquid is supplied to the first input port at a constant flow rate, the step (d) includes a step of detecting a presence or an absence of a wave in the interface, and the step (e) includes the step of determining a presence or the absence of pulsation in the target pump on the basis of a detection result of the presence or the absence of the wave.

8. The method as claimed in claim 7, wherein the step (d) includes the step of detecting a magnitude of the wave in the interface, and the step (e) includes the step of determining a magnitude of pulsation in the target pump on the basis of the magnitude of the wave.

9. The method as claimed in claim 1, wherein the step (d) includes the step of visually inspecting the interface by an inspector to determine the operation condition of the target pump from a result of visually inspecting the interface.

10. The method as claimed in claim 9, further comprising the step of magnifying an image of the interface inspected in the step (d) before the step of visually inspecting the interface.

11. The method as claimed in claim 1, wherein the step (b) comprises steps of:
   generating the reference flow with a reference pump having a cause of pulsation, the reference flow including pulsation; and
   providing an air chamber containing the first liquid and air and connected to the reference pump and the first input port to absorb the pulsation included in the reference flow.

12. The method as claimed in claim 11, wherein the step (b) further comprises the step of providing a metering valve in a fluid passage from the air chamber to the input port to further provide a resistance to the first fluid to adjust absorbing the pulsation included in the reference flow.

13. The method as claimed in claim 1, wherein the step (d) comprises the step of shooting an image of the interface with a camera to generate image data, and the step (e) comprises the step of supplying the image data to a computer to process the image data.

14. The method as claimed in claim 13, wherein the step (d) further comprises the step of displaying the processed image on a display to visually inspect the interface, and in the step (e), the operation condition is determined by an inspector on the basis of the result of processing the image data.

15. An inspection apparatus for inspecting a target pump, comprises:

a circuit comprising a substrate including first and second channels having first and second input ports, respectively, and a third channel having an end where the first and second channels meet and are continuously connected to the third channel;

a reference pump for supplying a first liquid at a constant pressure to the first input port to generate a reference flow, a second liquid being supplied by the target pump through the second input port; and a visualizing mechanism for visualizing an image of an interface of the first and second liquids joined in the third channel to provide an image of a condition of the interface between the first liquid and the second liquid being supplied by the target pump on the basis of the reference flow generated by supply at a constant pressure to inspect the target pump.

16. The inspection apparatus as claimed in 15, wherein the third channel is meandered.

17. The inspection apparatus as claimed in claim 15, wherein the visualizing mechanism comprises at least a transparent part in the substrate to make the third channel visual.

18. The inspection apparatus as claimed in claim 15, wherein the visualizing mechanism comprises a magnifying mechanism for magnifying the image of the interface and a display for displaying the magnified image.

19. The inspection apparatus as claimed in claim 15, wherein the visualizing mechanism comprises:

an imaging unit for shooting the image of the interface of the first and second liquids;

an image processing unit for processing the image from the imaging unit; and a display for displaying a result of processing the image.

20. The inspection apparatus as claims in claim 15, further comprising determining means for determining whether a pulsation is present in the target pump.

21. The inspection apparatus as claimed in claim 20, further comprising detection means for detecting a magnitude of pulsation to determine with a threshold whether the pulsation is present in the target pump.

22. The inspection apparatus as claimed in claim 21, further comprising image processing means for detecting a wave in the interface to detect the pulsation.

23. The inspection apparatus as claimed in claim 21, further comprising frequency detecting means for detecting a frequency of pulsation in the wave in the interface.

24. An inspection apparatus for inspecting a target pump, comprises:

a circuit comprising a substrate including first and second channels having first and second input ports, respectively, and a third channel having an end where the first and second channels meet and are continuously connected to the third channel;

a reference pump for supplying a first liquid to the first input port to generate a reference flow, a second liquid being supplied by the target pump through the second input port;

an air chamber containing the first liquid and air and connected to the reference pump to absorb a pulsation included in the reference flow to supply the reference flow to supply the first liquid to the first input port at a constant pressure; and a visualizing mechanism for visualizing an image of an interface of the first and second liquids joined in the third channel to provide an image of a condition of the interface between the first liquid and the second liquid being supplied by the target pump on the basis of the reference flow generated by supply at a constant pressure to inspect the target pump.

25. The inspection apparatus as claimed in claim 24, further comprising a metering valve in a fluid passage from the air chamber to the input port to provide a resistance to the first fluid to adjust the absorption of the pulsation included in the reference flow.

26. The inspection apparatus as claims in claim 24, further comprising determining means for determining whether a pulsation is present in the target pump.

27. The inspection apparatus as claimed in claim 26, further comprising detection means for detecting a magnitude of pulsation to determine with a threshold whether the pulsation is present in the target pump.

28. The inspection apparatus as claimed in claim 27, further comprising image processing means for detecting a wave in the interface to detect the pulsation.

29. The inspection apparatus as claimed in claim 27, further comprising frequency detecting means for detecting a frequency of pulsation in the wave in the interface.

* * * * *